United States Patent
Martin et al.

(10) Patent No.: US 6,328,054 B1
(45) Date of Patent: Dec. 11, 2001

(54) BALANCED FLUID PRESSURE REGULATOR

(75) Inventors: Richard L. Martin, Point Richmond; Louis A. Ollivier, Palo Alto, both of CA (US)

(73) Assignee: Parker-Hannifin Corporation-Veriflo division, Cleveland, OH (US)

( * ) Notice: Subject to any disclaimer, the term of this patent is extended or adjusted under 35 U.S.C. 154(b) by 0 days.

(21) Appl. No.: 09/610,539

(22) Filed: Jul. 7, 2000

(51) Int. Cl.[7] .................................................. G05D 16/02
(52) U.S. Cl. ..................... 137/15.17; 137/484.8; 137/505.18; 137/505.36; 251/54; 251/362
(58) Field of Search ........................... 137/484.8, 505.18, 137/505.36, 15.17, 15.24; 251/362, 54

(56) References Cited

U.S. PATENT DOCUMENTS

| | | | |
|---|---|---|---|
| 2,154,901 | * 4/1939 | Hulse et al. | 137/505.18 |
| 2,924,421 | * 2/1960 | Pohndorf | 251/362 X |
| 3,211,416 | * 10/1965 | Billeter et al. | 251/54 |
| 3,841,202 | * 10/1974 | Groves | 251/54 |
| 4,506,690 | * 3/1985 | Mitchell | 137/1 |
| 4,634,097 | * 1/1987 | Hubertson | 251/173 |
| 5,165,652 | * 11/1992 | Nicolaisen | 251/54 |
| 5,755,254 | * 5/1998 | Carter et al. | 137/340 |

* cited by examiner

*Primary Examiner*—Stephen M. Hepperle
(74) *Attorney, Agent, or Firm*—Antonelli, Terry, Stout & Kraus, LLP

(57) ABSTRACT

A balanced fluid pressure regulator of the disclosed embodiment comprises a balancing bellows inside a sensing bellows to minimize the supply pressure effect for improved performance while reducing the size and weight of the regulator in comparison to a conventional regulator. A sensing duct communicates the enclosed space between the bellows with the fluid passage of the regulator downstream from a poppet valve. The cross-sectional area of the fluid passage is reduced in the vicinity of the sensing duct for decreasing the pressure in the enclosed space at high gas flow rates. The valve seat in the regulator is supported so it is free to move during assembly of the regulator to self-align the seat with the poppet valve.

16 Claims, 5 Drawing Sheets

BALANCED FLUID PRESSURE REGULATOR

TECHNICAL FIELD

The present invention relates to an improved fluid pressure regulator for regulating the pressure of gas from a supply of pressurized gas, while minimizing the supply pressure effect. The regulator can be used for regulating the pressure of processing gas for making semiconductors.

BACKGROUND OF THE INVENTION

It is desired that fluid pressure regulators coupled to compressed gas cylinders or other containers containing pressurized gas at 2000 psi or greater produce a constant outlet pressure as the gas in the cylinder is used up, and the cylinder pressure decreases. For example, constant outlet pressures for pressurized nitrogen, nitrogen-arsine/phosphorous gas mixtures as dopants, argon, hydrogen and air, are desired in the manufacture and treatment of semiconductors. However, in typical known single-stage fluid pressure regulators, the outlet pressure increases by 9 psi as the cylinder pressure decreases from 2000 psi down to 200 psi. A variation in outlet pressure of 9 psi is relatively substantial in relation to the typical outlet pressure of the regulator, which may be in the range of 25 to 35 psi. This is a problem where process requirements, as in semiconductor manufacture, call for constant or substantially constant gas pressure.

A prior art, single-stage fluid pressure regulator 1 is schematically illustrated in FIG. 1 of the drawings. The pressure regulator 1 is shown connected at its inlet to a source of gas at high pressure, particularly a gas cylinder 2, which initially, when filled, contains a gas at a pressure of 2000 psi or higher. The function of the regulator is to receive pressured gas from the cylinder at the regulator inlet, which is connected to the cylinder, and to deliver the gas at a selected lower pressure from the outlet of the regulator, while minimizing the change in outlet pressure in the presence of changes in outlet flow and variations in supply pressure.

The regulator 1 comprises a diaphragm 3 and a valve 4. One end of the valve, the upper end in FIG. 1, contacts the diaphragm; and the other, outwardly tapered end of the valve cooperates with valve seat 5 for adjustably throttling a fluid passage 6 extending through the regulator. Particularly, the fluid passage 6 extends through central aperture 7 of the valve seat 5. The upper surface of the annular valve seat 5 is supported about the aperture 7 by regulator member 8. The lower, conical portion 9 of the valve 4 cooperates with the lower edge 10 of the seat about central aperture 7 for adjustably throttling the fluid passage through the regulator, thereby controlling the outlet pressure from the regulator. A spring 11 applies an adjustable force to the diaphragm 3.

The pressure regulator 1 operates on a force balance principle. The diaphragm 3 has an effective area A. The upper side of the diaphragm 3 is exposed to atmospheric pressure and has force $F_S$ applied thereto by the spring 11. The force $F_S$ is balanced by the force $F_{Po}$ created by the outlet pressure $P_o$. that is the fluid pressure downstream of the throttled aperture 7 in valve seat 5, which acts on the diaphragm and a force $F_{Ps}$, created by the supply pressure $P_s$, that is the fluid pressure from the gas cylinder 2 in the regulator 1 upstream of the throttled aperture 7 of the valve seat 5, acting against the valve 4 on an area a determined by the size of the aperture 7, geometry of valve, and size of opening.

Any imbalance will result in a deflection of the diaphragm 3 to vary the size of the flow passage between the valve seat and the lower, conical portion 9 of the valve, that is to vary the amount of throttling of fluid passage 6 through the regulator 1, and thereby create a new value of $P_o$ in order to restore the balance. If there is an increase in outlet flow, $P_o$ starts to decrease. This increases the size of the adjustable passage between valve and valve seat 5 to supply a greater flow. Thus, a small decrease in outlet pressure provides the larger flow demand. If there is a decrease in the supply pressure (pressure decay at the supply cylinder as a result of usage), the force imbalance tends to increase the size of opening between the valve seat 5 and valve 4 which increases $P_o$ and restores the balance. Thus, decrease in supply pressure increases the outlet pressure, for the same flow demand.

An equation defining the operation may be expressed as follows:

$$F_s = F_{Po} + F_{Ps}$$

or $$F_s = P_O A + (P_s - P_o)a$$

or solving for the outlet pressure $P_o$, $$P_O = \frac{F_s}{A} - (P_s - P_O)\frac{a}{A} = \frac{F_s - P_s a}{A - a}.$$

From the above analysis, it is seen that the effect of variations in the supply pressure on the outlet pressure $P_O$ are a function of the expressions:

$$(P_s - P_O)\frac{a}{A} \text{ and } \frac{F_s}{A}.$$

In a typical prior art regulator of the type illustrated in FIG. 1, $$\frac{a}{A} \text{ is } \frac{1}{200},$$

resulting in a supply pressure of +0.5 psi per 100 psi decrease in the supply pressure $P_s$.

The motion of the valve $\Delta d$ to change the flow is defined by the equation:

$$\Delta d = \frac{\Delta P o A + a(Ps - Po)}{k}, \text{ thus}$$

$$\Delta d \cong \frac{\Delta P_0 A}{k},$$

where k is the spring constant, 1b/inch, of the system ($K_s$ for the spring+$K_D$ for the diaphragm). As the flow is increased, an increase, $\Delta d$, in the valve opening is required to provide the additional flow. This is accompanied by a decrease in outlet pressure $P_O$.

FIG. 2 illustrates flow curves for the conventional regulator 1 which show outlet pressure $P_O$ as a function of the flow rate for different values of supply pressure $P_s$. FIG. 3 shows the effect of supply pressure change for regulator 1 with a typical supply pressure effect of 0.5 psi per 100 psi. The slope of the basic supply pressure effect, shown as a dotted line, is modified by the corresponding flow curve as an increase in the supply pressure decreases the valve motion drop for a given flow, but only partially recovers the decrease created by the supply pressure effect. Thus, this conventional, single-stage regulator 1 is undesirable for fluid pressure regulation where a constant or substantially constant outlet pressure for a given flow rate is necessary as the pressure in the gas cylinder decreases from 2000 psi to, for example, 200 psi. From FIG. 3, for example, with a flow rate of 50 liters per minute, it is seen that at 2000 psi, the outlet pressure is between 17 and 18 psi, whereas at 500 psi, the outlet pressure has increased to between 23 and 24 psi, an increase of approximately 8 psi or almost 50 percent.

One prior art solution to this problem is the two-stage fluid pressure regulator. The first stage of the regulator reduces the high pressure from the supply to an intermediate pressure, for example, 400 psi, and a second stage of the regulator further reduces the pressure to a substantially constant outlet pressure. However, two-stage regulators are disadvantageous in that they are relatively costly and heavy.

Another prior art solution to the problem of supply pressure effect in regulators is depicted in FIG. 4, wherein regulator 12 is provided with a balanced poppet 13. A piston 14 opposite the poppet 13 and connected thereto has an area approximately the same as the area of the poppet so that the inlet pressure force acting on the poppet has little effect. However, these regulators can be disadvantageous in that they are relatively large and heavy. The seal or packing 15 about the piston 14 can also be a source of particulate contamination to the pressurized gas. The necessary loose fit of the piston 14 within the regulator for proper functioning is can also result in gas leakage past the seal 15 and the piston 14 in the lock-up state (no-flow condition) of the regulator leading to leakage pressure build up at the outlet of the regulator.

There is a need for an improved fluid pressure regulator which can overcome the problem of the supply pressure effect in an efficient and cost-effective manner, without the aforementioned drawbacks of the conventional solution thereto.

SUMMARY OF THE INVENTION

A fluid pressure regulator for regulating the pressure of gas from a supply of pressurized gas according to the invention comprises a fluid passage having an inlet and an outlet for the flow of pressurized gas from a supply of pressurized gas through the regulator. A poppet valve is movably positioned in the regulator for adjustably throttling the fluid passage and the flow of pressurized gas therethrough. A balancing bellows is located opposite the poppet valve and connected thereto. The balancing bellows has approximately the same area as the poppet valve so that the inlet pressure force from the gas acting on the poppet valve has little effect on the pressure of the gas supplied by the regulator. The bellows is leak-free and precludes particulate generation that results from the piston and piston packing that is typically used in the conventional regulator of FIG. 4.

The regulator of the invention further comprises a sensing bellows located about the balancing bellows and a sensing duct communicating an enclosed volume between the sensing bellows and the balancing bellows with the fluid passage downstream from the poppet valve. Locating the balancing bellows within the larger sensing bellows conserves space. The use of bellows for both balancing and sensing results in smaller overall size, compared to the typical piston and diaphragm design of FIG. 4, because a bellows can be compressed considerably farther and has a larger effective area than a diaphragm of similar diameter. Also, performance is improved with the use of bellows because the effective area does not change with movement as it does with the diaphragm.

According to a further feature of the invention, the cross-sectional area of the fluid passage of the regulator is reduced in the vicinity of the sensing duct for decreasing the pressure acting on the sensing bellows at high gas flow rates. The causes the poppet to open proportionally farther, with increased flow (demand) than would occur if pressure at the outlet were used. This positive gain of the regulator with increasing demand helps offset the decreasing outlet pressure (droop) as the demand increases due to decreased spring and/or bellows (or diaphragm) force(s) acting to close the poppet. As a result, the droop in the regulator of the invention can be reduced to about half what would otherwise be expected for the components used in the regulator.

The fluid pressure regulator of the invention also includes a valve seat and a valve seat holder. At least one of the valve seat and the valve seat holder are free to move in the regulator during assembly of the regulator before the valve seat is compressed to self-align the seat with the poppet valve.

A method of the invention for reducing the size and weight of a fluid pressure regulator for regulating the pressure of gas from a supply of pressurized gas is thus seen to comprise balancing a poppet valve of the regulator with respect to inlet pressure of pressurized gas on the poppet valve by providing a balancing bellows opposite the poppet valve and connected thereto, the balancing bellows having approximately the same area as the poppet valve, and locating a sensing bellows in the regulator about the balancing bellows.

These and other objects, features and advantages of the present invention will become more apparent from the following description of the disclosed embodiments of the invention.

DETAILED DESCRIPTION OF THE PREFERRED EMBODIMENTS

Figure 1:
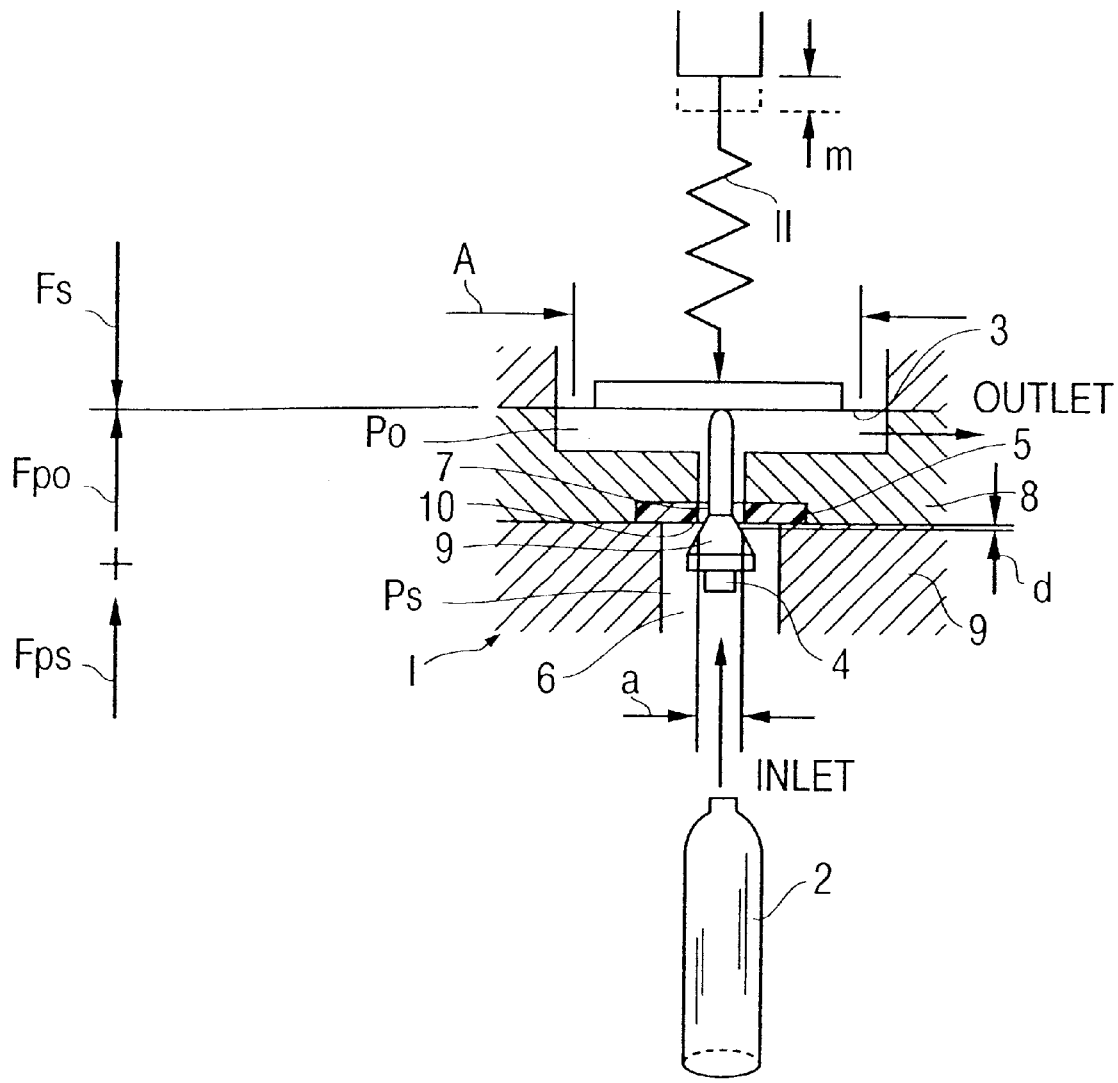
FIG. 1 is a schematic illustration of a prior art regulator connected to a high pressure gas cylinder for regulating the flow of gas from the cylinder.
Figure 2:
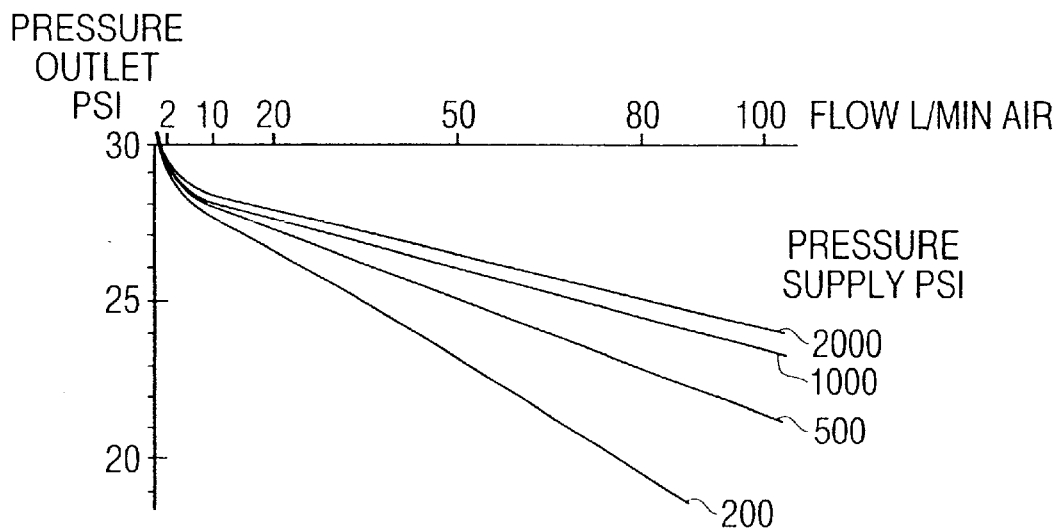
FIG. 2 is a characteristic of a prior art regulator of FIG. 1, showing the outlet pressure of the regulator as a function of the outlet flow from the regulator in the case of a supply pressure of 2000 psi, of 1000 psi, and of 500 psi and of 200 psi at the inlet of the regulator.
Figure 3:
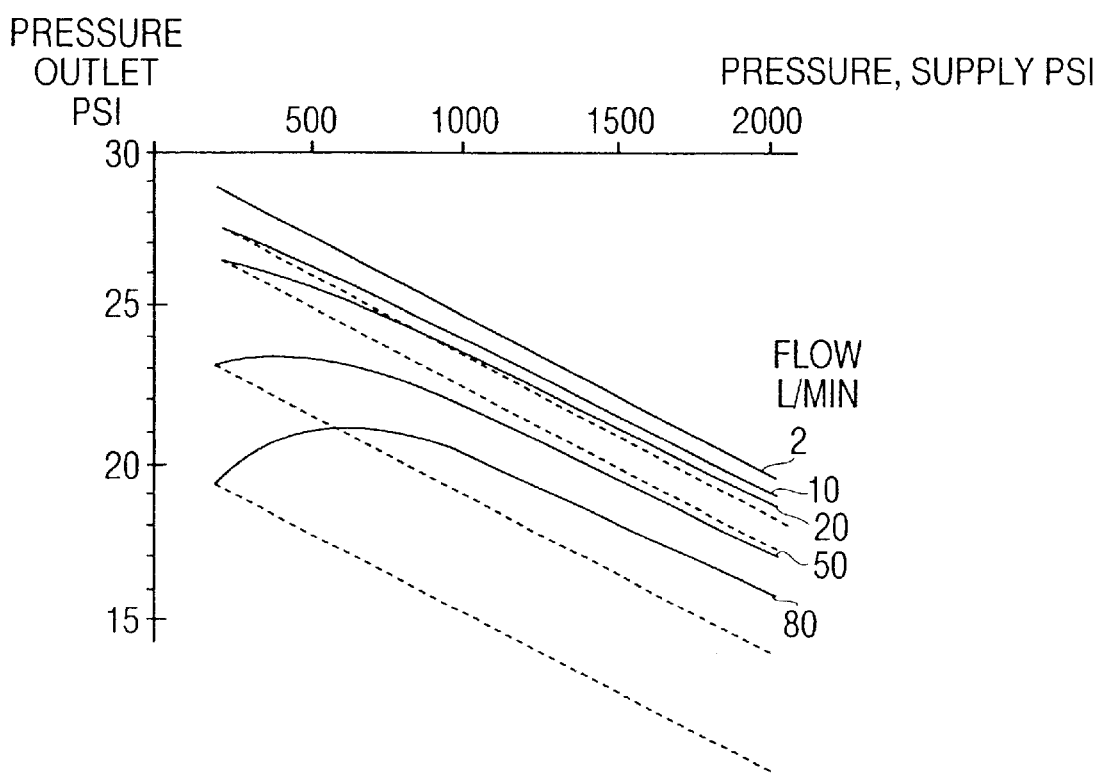
FIG. 3 is a graph illustrating the effect of supply pressure changes for the prior art and regulator of FIG. 1 with a typical supply pressure effect of 0.5 psi per 100 psi for each of the flow rates of 2, 10, 20, 50, and 80 liters per minute.
Figure 4:
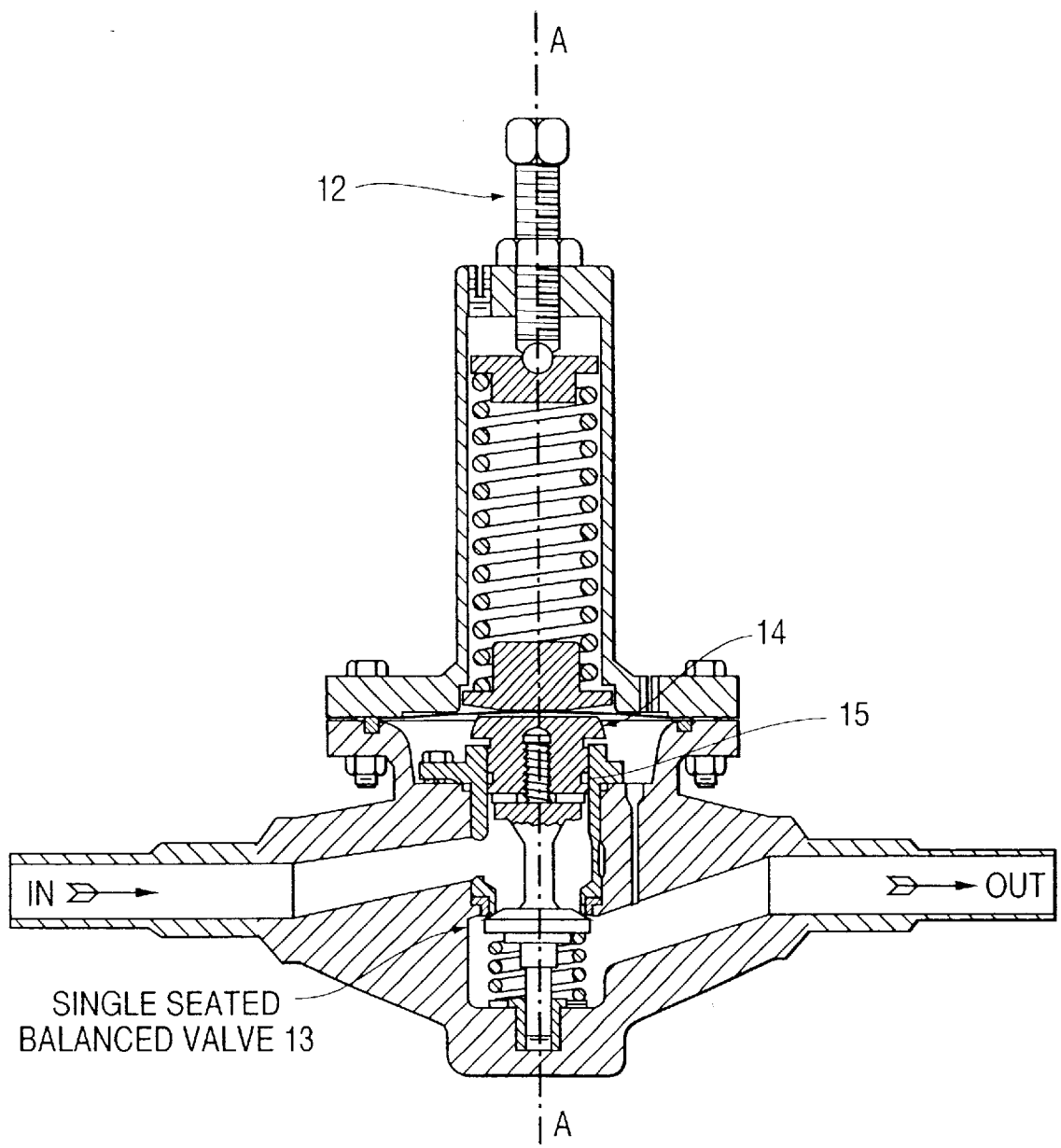
FIG. 4 is a schematic illustration in cross-section along a longitudinal axis A—A of a conventional fluid pressure regulator with a balanced poppet design using a piston opposite the poppet.
Figure 5:
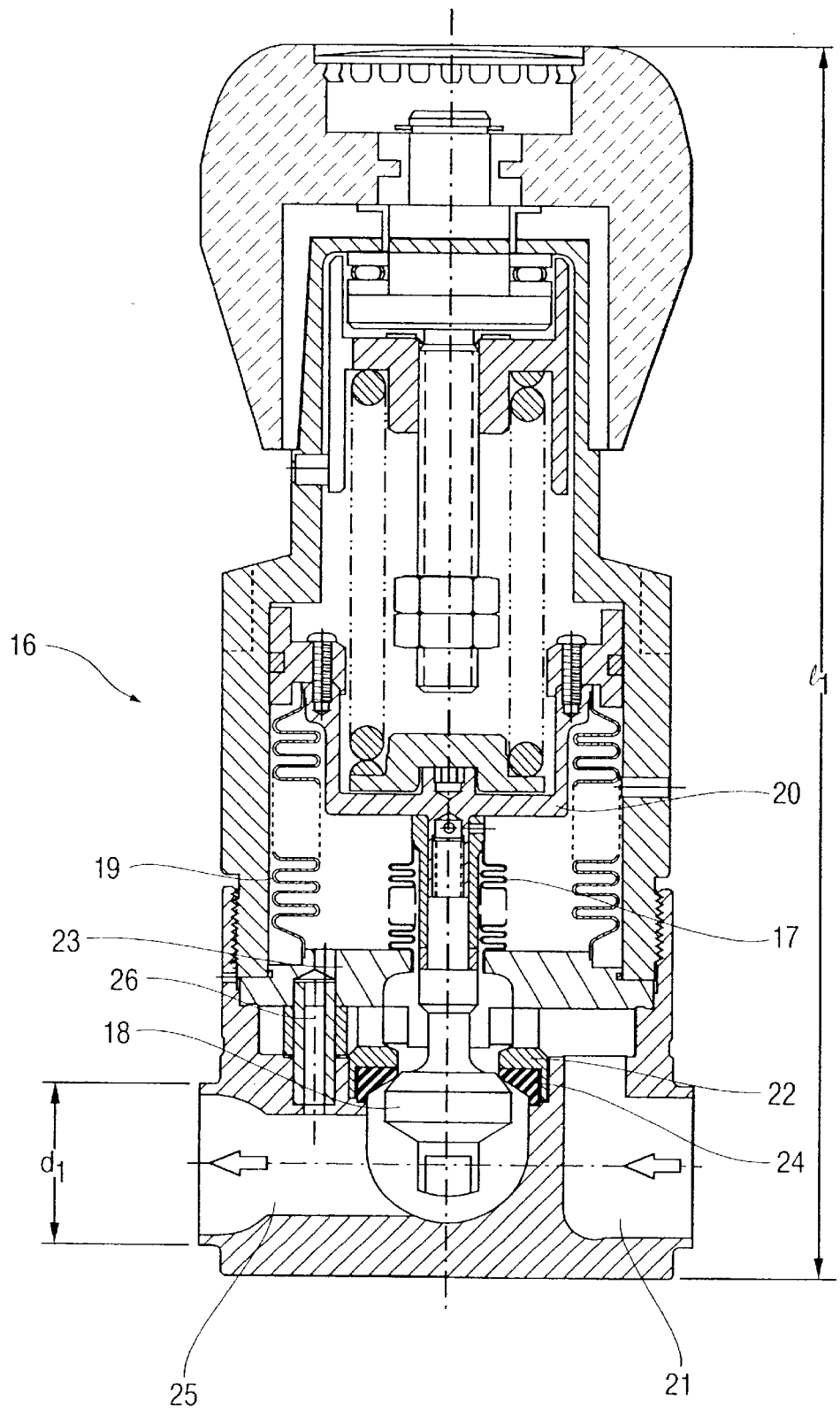
FIG. 5 is a cross-sectional view taken along a longitudinal axis B—B of a balanced fluid pressure regulator according to a first embodiment of the invention.

Referring now to the drawings, a manually operated fluid pressure regulator 16, according to a first embodiment of the invention, is shown in FIG. 5. In the regulator 16, a small bellows 17 is used opposite the poppet 18 for balancing. The bellows is leak-free and precludes particulate generation that results from the piston and piston packing that is typically used in the conventional regulator of FIG. 4. The balancing bellows 17 is located within a large sensing bellows 19 to conserve space.

Use of bellows 17 and 19 for balancing and sensing, respectively, results in small overall size of the regulator as compared to the typical piston-and-diaphragm design of FIG. 4, because a bellows can be compressed considerably farther and has a larger effective area than a diaphragm of similar diameter. Also, performance is improved with the use of bellows, because the effective area does not change with movement as it does with a diaphragm.

The poppet 18 of the regulator 16 is guided and damped by a piston 20 of the regulator that is located outside the fluid passage or path 21 so that contamination from generation of particulate from the piston is precluded. A seat holder 22 of the regulator rests on a flat surface of bellows plate 23 so that on assembly, it is free to move, thus self-aligning the seat 24 with the poppet 18 before the seat is compressed.

The outlet passage 25 of the flow path 21 is reduced in cross-sectional area in the region of a sensing duct 26 communicating with the fluid passage with the enclosed volume between the bellows 17 and 19 so that as the flow velocity of the gas is increased at high flow rates, the pressure acting on the sensing bellows by way of the duct 26 decreases. Pressure downstream in the outlet passage 25 increases as the passage size increases, thereby lowering of the velocity. This arrangement causes the poppet 18 to open proportionally farther, with increased flow (demand) than would occur if pressure at the outlet were used. The proportionally greater opening of the poppet is sometimes called "gain", because most regulators exhibit decreasing outlet pressure (droop) as the demand increases due to increased spring and/or bellows (or diaphragm) force(s) acting to close the poppet. Gain in the balanced fluid pressure regulator 16 of the invention reduces droop to about half what would otherwise be expected for the components used in the regulator.

Figure 6:
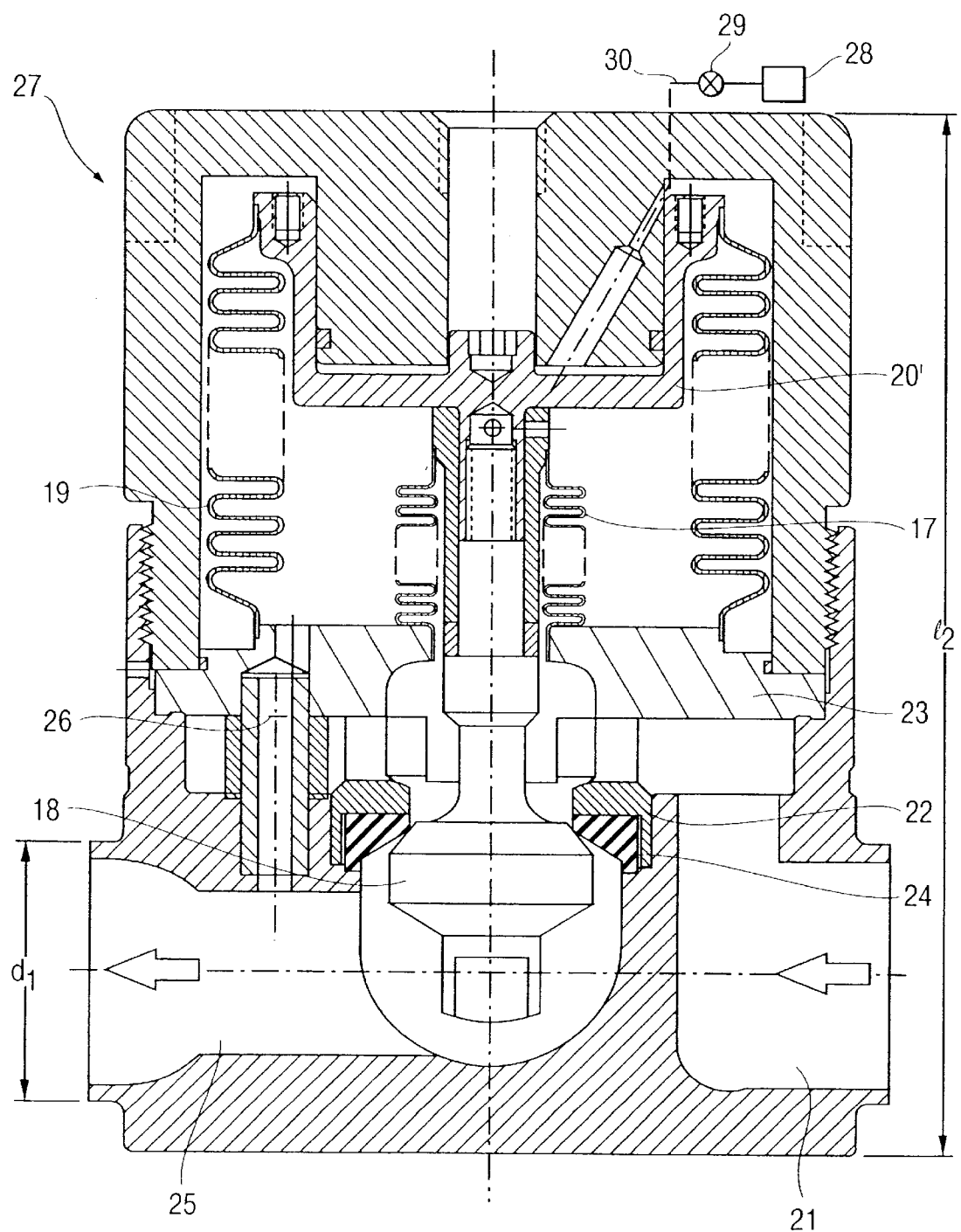
FIG. 6 is a cross-sectional view taken along a longitudinal axis C—C of a balanced fluid pressure regulator according to a second embodiment of the invention.

The regulator 27 of the embodiment of the invention illustrated in FIG. 6 is a dome-loaded regulator. Pressure applied to the dome from pressurized gas supply 28 by way of valve 29 applies a force above the bellows 19 of the regulator for setting the outlet pressure of the regulator. This arrangement replaces the large spring found in the manually operated regulator of FIG. 5. This arrangement results in better regulation, smaller size and lower cost than the manual regulator, but a regulated supply line 30 is required for dome operation.

In the regulators 16 and 27 of the disclosed embodiments, the balancing bellows 17 is hydraulically formed from thin alloy metal tubing. Stainless steel 321 (ASTM) and Inconel 718 tubing with wall thickness of 0.0056", for example, can be employed. The regulators 16 and 27 each have an outlet passage with a diameter $d_1$ of 1.0". The height or length $l_1$ of the regulator 16 in FIG. 5 is 7.63", while that of the regulator 27, $l_2$, is 4.00". In these embodiments, the balance bellows 17 is formed with convolutions having an internal diameter of 0.425" and an outer diameter of 0.720". At the ends of the bellows, the internal diameter is 0.428". This provides the bellows with an effective area, also referred to as "equivalent area" of 0.256 $inch^2$. The effective area or equivalent area is a function of the mean diameter of the convolutions of the bellows. The bellows 17 is laser welded at its ends to piston 20/20' and bellows plate 23 for sealing the fluid passage through the regulator.

The sensing bellows 19 of the regulators 16 and 27 has a two-ply construction, each layer being 0.006" thick. The bellows is mechanically formed with wheels from telescoped inner and outer tubing of stainless steel 321, for example. The outside diameter of the convolutions of the large bellows 19 is 2.11" and the internal diameter, 1.56". The effective or equivalent area of the bellows is $2.65"^2$. The large bellows has a free length overall of 2" and is laser welded at its ends to the piston 20/20' and the bellows plate 23 as shown in the drawings. The multiply construction of the large bellows reduces the spring rate of the outer bellows and allows for more deflection. In a larger regulator, a 2" regulator, for example, a three-ply bellows construction can be employed.

For purposes of minimizing the supply pressure effect, in the disclosed embodiment, the effective area of the balance bellows 17 is selected to be "similar" to the effective area of the poppet in the closed position of the regulator, that is, it is ±10 percent of the effective area of the poppet, depending on the size of the poppet. More particularly, with the conically tapered poppet 18 of the disclosed embodiment, as the poppet opens, the pressure area from the poppet tends to decrease a little, 4–5 percent, depending on how far the poppet is stroked. Therefore, in the depicted embodiments, the effective area of the bellows 17 is preferably selected to be slightly smaller than the effective area of the poppet in the closed position. The outer bellows 19 in each of the regulators 16 and 27 takes the place of the diaphragm in the conventional regulator of FIG. 4. The free length of the balancing bellows 17 in the regulators 16 and 27 is 0.81" overall. The outer bellows 19 is used as a spring and is compressed 0.31" in use to put a load on the valve seat 24.

A total clearance of 0.20" is provided for the seat 24 within the seat holder 22 and for the seat holder 22 within the recess therefor in the body of the regulator. The seat 24 is formed of KelF plastic and is compressed almost 0.020" after assembly of the regulator. Because of the clearances, the valve seat will be self-centering with respect to the poppet during assembly before it is locked in position to effect a static seal in the regulator.

The regulators 16 and 27 of the invention are advantageously one-half the size (dimensionally) as compared with the comparable conventional regulator of FIG. 4 and one-fourth the size (in weight and volume), 28 lbs. versus 7 lbs., as compared with the conventional regulator of FIG. 4. Thus, the space-saving and material-saving benefits of the invention are substantial.

The regulators 16 and 27 in the disclosed embodiments can be used to control the gas pressure in compressed gas lines or from containers containing compressed gas at an initial pressure of 500 psi for example, with regulator outlet pressure settings between 60 and 200 psi. Liquified bulk gas in such containers, initially at 500 psi pressure, will decrease to as low as 100–120 psi pressure as the gas is dispensed from the container using the regulator. Under these conditions, flow rates of 5000 liters/minute can be provided by the regulator with minimal supply pressure effect.

While we have shown and described only two embodiments of the present invention herein, it will be readily understood by the skilled artisan that variations of the fluid pressure regulator and method of the invention are possible without departing from the scope of our invention. Therefore, we do not wish to be limited to the details shown and described herein but intend to cover all such changes and modifications as are encompassed by the scope of the appended claims.

We claim:

1. A fluid pressure regulator for regulating the pressure of gas from a supply of pressurized gas, said regulator comprising:

a fluid passage having an inlet and an outlet for the flow of pressurized gas from a supply of pressurized gas through said regulator;

a poppet valve movably positioned in said regulator for adjustably throttling said fluid passage and the flow of pressurized gas therethrough;

a balancing bellows located opposite said poppet valve and connected thereto, said balancing bellows having approximately the same area as said poppet valve so that the inlet pressure force from said gas acting on said poppet valve has little effect on the pressure of said gas supplied by said regulator; and a piston connected to the poppet valve for guiding and damping the movement of the poppet valve, the piston being located outside of the fluid passage so that contamination of the pressurized gas from generation of particulate from the piston is precluded.

2. The regulator according to claim 1, wherein said balancing bellows is leak-free and precludes particulate generation.

3. A fluid pressure regulator for regulating the pressure of gas from a supply of pressurized gas, said regulator comprising:

a fluid passage having an inlet and an outlet for the flow of pressurized gas from a supply of pressurized gas through said regulator;

a poppet valve movably positioned in said regulator for adjustably throttling said fluid passage and the flow of pressurized gas therethrough;

a balancing bellows located opposite said poppet valve and connected thereto, said balancing bellows having approximately the same area as said poppet valve so that the inlet pressure force from said gas acting on said poppet valve has little effect on the pressure of said gas supplied by said regulator;

a sensing bellows located about said balancing bellows; and a sensing duct communicating an enclosed volume between said sensing bellows and said balancing bellows with said fluid passage downstream from said poppet valve.

4. The regulator according to claim 3, wherein the cross-sectional area of said fluid passage is reduced in the vicinity of said sensing duct for decreasing the pressure acting on the sensing bellows at high gas flow rates.

5. The regulator according to claim 1, further comprising a valve seat and a valve seat holder, at least one of said valve seat and said valve seat holder being free to move in said regulator during assembly of said regulator before said valve seat is compressed to self-align the seat with said poppet valve.

6. A fluid pressure regulator for regulating the pressure of gas from a supply of pressurized gas, said regulator comprising:

a fluid passage having an inlet and an outlet for the flow of pressurized gas from a supply of pressurized gas through said regulator;

a poppet valve movably positioned in said regulator for adjustably throttling said fluid passage and the flow of pressurized gas therethrough;

a balancing bellows located opposite said poppet valve and connected thereto, said balancing bellows having approximately the same area as said poppet valve so that the inlet pressure force from said gas acting on said poppet valve has little effect on the pressure of said gas supplied by said regulator;

a valve seat and a valve seat holder, at least one of said valve seat and said valve seat holder being free to move in said regulator during assembly of said regulator before said valve seat is compressed to self-align the seat with said poppet valve; and wherein said valve seat holder rests on a flat surface of a bellows plate of said regulator so that it is free to move for said self-aligning during assembly.

7. The regulator according to claim 5, wherein said valve seat is supported with clearance in said valve seat holder so that it is free to move for said self-aligning during assembly.

8. The regulator according to claim 1, further comprising a device for applying a regulator outlet pressure setting force on said poppet valve, said device including an adjustable spring.

9. The regulator according to claim 1, further comprising a device for applying a regulator outlet pressure setting force on said poppet valve, said device including a piston located outside said fluid passage and connected to said poppet valve and means for applying a fluid pressure to said piston for providing said regulator outlet pressure setting force.

10. A fluid pressure regulator for regulating the pressure of gas from a supply of pressurized gas, said regulator comprising:

a fluid passage having an inlet and an outlet for the flow of pressurized gas from a supply of pressurized gas through said regulator;

a poppet valve movably positioned in said regulator for adjustably throttling said fluid passage and the flow of pressurized gas therethrough;

a member which can be moved in response to a force imbalance thereon for moving said poppet valve;

a sensing bellows enclosing a space in communication with said member on a side of said member such that an increase in gas pressure in said enclosed space increases a force on the member in a direction acting to move the poppet valve to close the fluid passage; and a sensing duct communicating said enclosed space with said fluid passage downstream from said poppet valve, wherein the cross-sectional area of said fluid passage is reduced in the vicinity of said sensing duct for decreasing the pressure in said enclosed space acting on said movable member at high gas flow rates to provide the regulator with a positive gain which causes the poppet valve to open proportionally further with increased flow.

11. A method of reducing the size and weight of a fluid pressure regulator for regulating the pressure of gas from a supply of pressurized gas, said method comprising:

balancing a poppet valve of the regulator with respect to inlet pressure of pressurized gas on said poppet valve by providing a balancing bellows opposite said poppet valve and connected thereto, said balancing bellows having approximately the same area contacted by the inlet pressure of the pressurized gas in the closed position of the regulator as said poppet valve, and locating a sensing bellows of said regulator about said balancing bellows.

12. The method according to claim 11, including communicating an enclosed space between said balancing bellows and said sensing bellows via a sensing duct with a reduced cross-sectional area section of a fluid passage of said regulator downstream of said poppet valve.

13. The method according to claim 11, including providing a valve seat for said poppet valve in said regulator and supporting said valve seat during assembly of the regulator so that said valve seat is free to move to self-align the seat with said poppet valve.

14. A fluid pressure regulator for regulating the pressure of gas from a supply of pressurized gas, said regulator comprising:
- a fluid passage having an inlet and an outlet for the flow of pressurized gas from a supply of pressurized gas through said regulator;
- a poppet valve movably positioned in said regulator for adjustably throttling said fluid passage and the flow of pressurized gas therethrough; and
- a balancing bellows located opposite said poppet valve and connected thereto, said balancing bellows having approximately the same area contacted by the inlet pressure of the pressurized gas as said poppet valve in the closed position of the regulator so that the inlet pressure force from said gas acting on said poppet valve has little effect on the pressure of said gas supplied by said regulator.

15. The regulator according to claim 14, further comprising a piston located outside said fluid passage and connected to said poppet valve for guiding and damping the movement of the poppet valve.

16. The regulator according to claim 14, wherein said balancing bellows is leak-free and precludes particulate generation.

* * * * *